J. C. DUPLER.
ANTISKIDDING DEVICE.
APPLICATION FILED MAR. 29, 1920.
1,353,329. Patented Sept. 21, 1920.
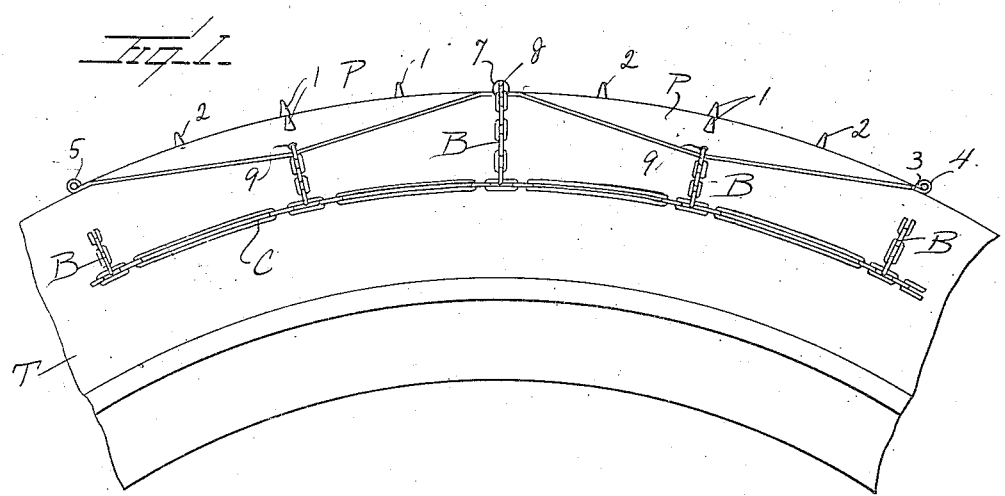
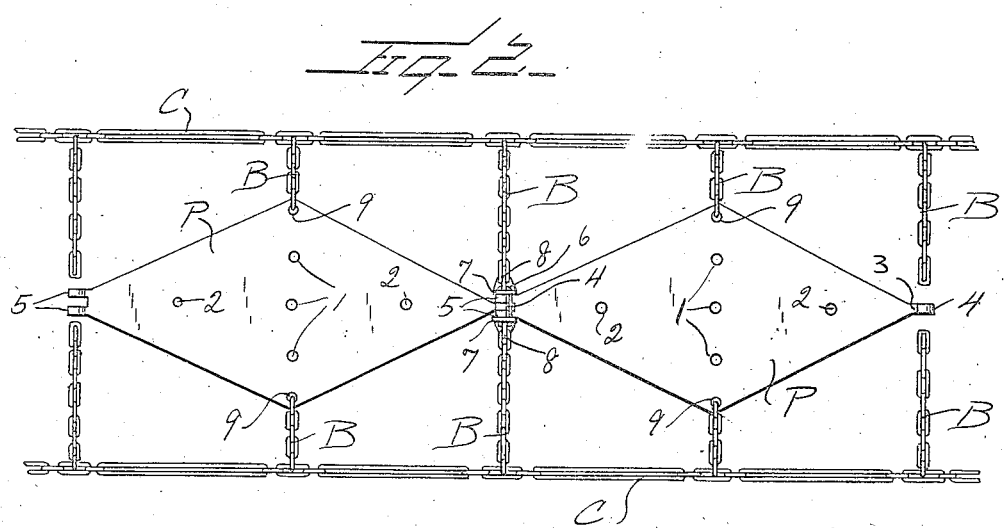
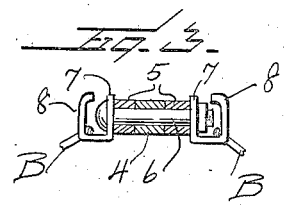
Inventor
J. C. Dupler
By Watson E. Coleman
Attorney

UNITED STATES PATENT OFFICE.

JOHN C. DUPLER, OF MARIETTA, PENNSYLVANIA.

ANTISKIDDING DEVICE.

1,353,329.   Specification of Letters Patent.   Patented Sept. 21, 1920.

Application filed March 29, 1920. Serial No. 369,632.

*To all whom it may concern:*

Be it known that I, JOHN C. DUPLER, a citizen of the United States, residing at Marietta, in the county of Lancaster and State of Pennsylvania, have invented certain new and useful Improvements in Antiskidding Devices, of which the following is a specification, reference being had to the accompanying drawings.

This invention relates to anti-skidding devices for wheel structures and is particularly designed and adapted for use in connection with a wheel structure embodying a conventional type of pneumatic tire, and it is an object of the invention to provide a novel and improved device of this general character including a plurality of hingedly connected plates extending circumferentially of the tread portion of the wheel structure when the device is applied, together with means whereby the device may be effectively maintained in applied position.

The invention consists in the details of construction and in the combination and arrangement of the several parts of my improved device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation illustrating an anti-skidding device constructed in accordance with an embodiment of my invention and in applied position;

Fig. 2 is a fragmentary view in top plan of my anti-skidding device unapplied; and Fig. 3 is an enlarged fragmentary view partly in section and partly in elevation illustrating in detail the hinged connection between adjacent plates and the means for securing the branch chains thereto;

Fig. 4 is a fragmentary view in side elevation illustrating a tying means or coupling adapted for coaction with a side chain.

As disclosed in the accompanying drawings, my improved anti-skidding device comprises a plurality of substantially diamond shaped plates P, longitudinally alined when assembled and circumferentially spaced when in applied position upon a wheel structure. Each of the plates P possesses a certain degree of inherent resiliency so that the same may readily conform to the periphery of the tire T of the wheel structure to which the device is applied. Each of the plates P is provided at substantially its longitudinal center with a series of transversely disposed gripping lugs 1 and with a gripping lug 2 adjacent each end thereof. One end portion of each of the plates P is provided with an extension 3, preferably integrally formed therewith and which is provided with a knuckle 4, and the opposite end portion of the plate is provided with a pair of transversely spaced knuckles 5. The knuckle 4 of one adjacent plate is adapted to seat between the knuckles 5 of the plate adjacent thereto and disposed through said assembled knuckles 4 and 5 is a bolt 6 or the like whereby adjacent plates P are integrally connected. Mounted upon the opposite end portions of the bolt 6, or the like, and surrounding the same are the annular plates 7, each provided with an outstanding loop 8 disposed radially thereacross and effectively secured to the peripheral portion of said plate.

Coacting with the opposite sides of a wheel structure in a well known manner are the side chains C and each of said side chains C, at predetermined points therealong, is provided with the inwardly disposed and laterally directed branch chains B. Certain of said chains B are also secured to the loops 8, hereinbefore referred to, while the remainder of said chains are secured to the side apex portions of the plates P and for which reason, said portions of the plates P are provided with the openings 9 to facilitate such engagement or connection.

Either or both of the chains C may have interposed therein a tying or connecting medium of any ordinary or preferred type and as particularly illustrated in Fig. 4 the tying or connecting medium comprises a hook member 10 having its shank freely engaged with an end portion of the chain C and provided with an elongated bill 11 adapted to be inserted through the link at the opposite end of the chain. Coacting with the bill 11 is a holding member 12 comprising an annular member or the like slidably engaged with a link of the chain C adjacent the end of the chain to which the hook member 10 is anchored. The outer end portion of the bill 11 is provided with an outstanding lug 14 whereby means are provided for holding the member 12 from being moved out of operative coaction with the bill 11.

My improved device, when not applied to a wheel structure, may also be folded or compacted within a relative small space so that the same may be readily transported.

From the foregoing description, it is thought to be obvious that a device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A device of the character described comprising, in combination, a series of plates, adjacent end portions of the plates being provided with interfitting knuckles, a connecting member disposed through the interfitting knuckles whereby adjacent plates are hingedly connected, side chains, and branch chains operatively engaged with the side chains and with the opposite end portions of the connecting members.

2. A device of the character described comprising, in combination, a plurality of plates, the opposed end portions of adjacent plates being provided with interfitting knuckles, members passing through said interfitting knuckles whereby adjacent plates are hingedly connected, loop members engaged with the opposite end portions of the first named members, side chains, and branch chains operatively engaged with the side chains and the loop members.

3. A device of the character described comprising, in combination, a plurality of plates, the opposed end portions of adjacent plates being provided with interfitting knuckles, members passing through said interfitting knuckles whereby adjacent plates are hingedly connected, loop members engaged with the opposite end portions of the first named members, side chains, and branch chains operatively engaged with the side chains and the loop members, each of said loop members including an annular plate surrounding an end portion of one of the first named members.

In testimony whereof I hereunto affix my signature.

JOHN C. DUPLER.